US008633871B2

(12) United States Patent
Okuno

(10) Patent No.: US 8,633,871 B2
(45) Date of Patent: *Jan. 21, 2014

(54) IMAGE PROCESSING APPARATUS AND IMAGE PROCESSING METHOD

(75) Inventor: Yasuhiro Okuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,080

(22) Filed: May 31, 2012

(65) Prior Publication Data
US 2012/0236179 A1 Sep. 20, 2012

Related U.S. Application Data

(63) Continuation of application No. 11/764,377, filed on Jun. 18, 2007, now Pat. No. 8,207,909.

(30) Foreign Application Priority Data

Jun. 28, 2006 (JP) ................................ 2006-178582

(51) Int. Cl.
*G09G 5/00* (2006.01)

(52) U.S. Cl.
USPC .................. 345/8; 345/9; 345/157; 345/169; 463/31; 463/37

(58) Field of Classification Search
USPC ............ 345/633, 7–9, 156–158, 169; 463/31, 463/37–38; 348/734
See application file for complete search history.

(56) References Cited

U.S. PATENT DOCUMENTS

| 2003/0032484 | A1* | 2/2003 | Ohshima et al. | 463/43 |
| 2004/0066417 | A1* | 4/2004 | Anabuki et al. | 345/848 |
| 2006/0050069 | A1* | 3/2006 | Okuno et al. | 345/419 |
| 2006/0256110 | A1* | 11/2006 | Okuno et al. | 345/419 |

FOREIGN PATENT DOCUMENTS

GB          2 376 397 A       12/2002

OTHER PUBLICATIONS

XP055049925_George Rathjen, Virtual Reality and Technologies for Combat Simulation, Sep. 1, 1994.
XP010295091_Jun Rekimoto, Matrix: A Realtime Object Identification and Registration Method for Augmented Reality, 1998 IEEE, pp. 63-68.
European Search Report issued on Jan. 25, 2013, that issued in the corresponding European Patent Application No. 07109691.1.

* cited by examiner

*Primary Examiner* — Lun-Yi Lao
*Assistant Examiner* — Kelly B Hegarty
(74) *Attorney, Agent, or Firm* — Cowan, Liebowitz & Latman, P.C.

(57) ABSTRACT

If an image acquired from a video camera (113) contains a two-dimensional bar code as information unique to an operation input device (116), information unique to the video camera (113) and the information unique to the operation input device (116) are managed in a shared memory (107) in association with each other.

5 Claims, 16 Drawing Sheets

FIG. 4

| SID | X | Y | Z | Roll | Pitch | Yaw |
|-----|-----|-----|-----|-------|--------|-------|
| 1 | x1 | y1 | z1 | roll1 | pitch1 | yaw1 |
| 2 | x2 | y2 | z2 | roll2 | pitch2 | yaw2 |

F I G. 6

| DID | OPERATION INFORMATION |
|-----|----------------------|
| 1   | 1                    |
| 2   | 0                    |

FIG. 8A

| PID | DID |
|---|---|
| 1 | -1 |
| 2 | -1 |

FIG. 8B

| PID | DID |
|---|---|
| 1 | 1 |
| 2 | 2 |

FIG. 8C

| PID | DID |
|---|---|
| 1 | 2 |
| 2 | -1 |

PRIOR ART

F I G. 12
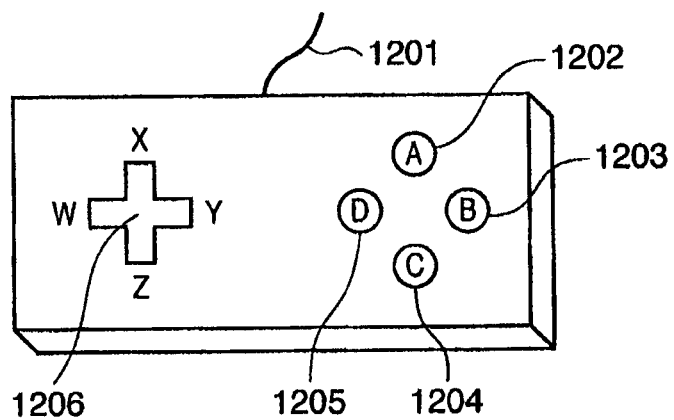
PRIOR ART

F I G. 15

| SID | X | Y | Z | Roll | Pitch | Yaw |
|---|---|---|---|---|---|---|
| 1 | x1 | y1 | z1 | roll1 | pitch1 | yaw1 |
| 2 | x2 | y2 | z2 | roll2 | pitch2 | yaw2 |
| 3 | x3 | y3 | z3 | roll3 | pitch3 | yaw3 |
| 4 | x4 | y4 | z4 | roll4 | pitch4 | yaw4 |

F I G. 16
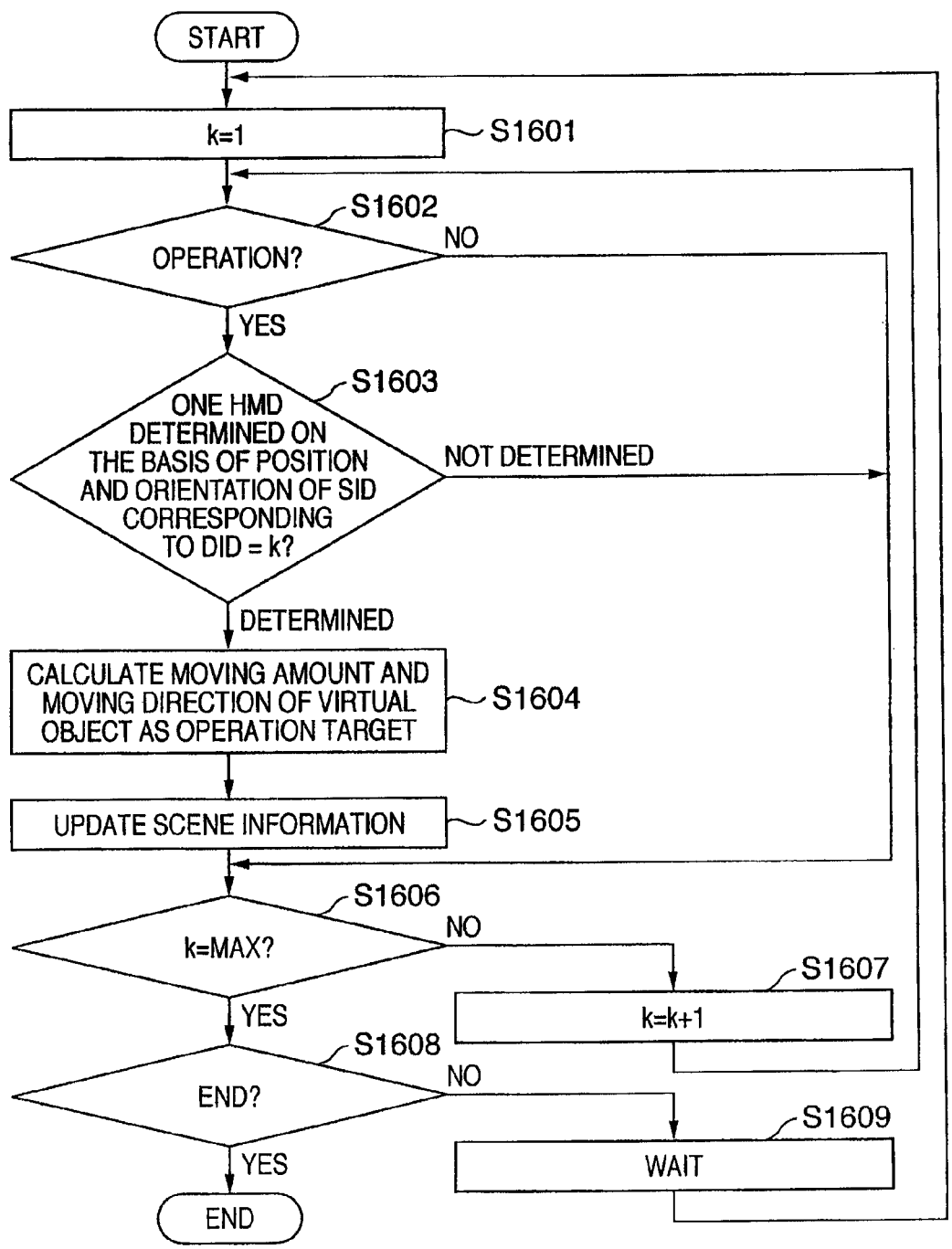

IMAGE PROCESSING APPARATUS AND IMAGE PROCESSING METHOD

CROSS-REFERENCE TO RELATED APPLICATION

This application is a continuation of application Ser. No. 11/764,377, filed Jun. 18, 2007, the entire disclosure of which is hereby incorporated by reference.

BACKGROUND OF THE INVENTION

1. Field of the Invention

The present invention relates to a mixed reality presentation technique.

2. Description of the Related Art

There are conventionally mixed reality (MR) presentation apparatuses. For example, a mixed reality presentation apparatus comprises an image display means (e.g., HMD: Head Mounted Display), a physical image capturing means, a virtual image generation means, a position and orientation detection means (e.g., position and orientation sensor), and a composition means for compositing the physical image and virtual image.

A typical example of the physical image capturing means has a small camera attached to the HMD to capture the scene in front of the HMD and records the captured image in the memory of a computer.

The position and orientation detection means is used to detect, for example, the position and orientation of the physical image capturing means. For example, a magnetic position and orientation sensor is attached to the detection target (e.g., a small video camera serving as the physical image capturing means) to detect its position and orientation. The magnetic position and orientation sensor detects the relative position and orientation between a magnetic field generator (transmitter) and a magnetic sensor (receiver). The position and orientation sensor can detect the three-dimensional position (X,Y,Z) and orientation (Pitch,Yaw,Roll) of the sensor in real time.

The virtual image generation means lays out a three-dimensionally modeled CG in a virtual space with the same scale as the physical space and renders the scene of the virtual space from the same position and orientation as those of the small video camera upon capturing the physical space, thereby obtaining a CG image.

The composition means generates a mixed reality image by superimposing the virtual image obtained by the virtual image generation means on the image obtained by the physical image capturing means. For example, the composition means writes an image captured by the physical image capturing means in the video memory of a computer and then writes a CG image obtained by the virtual image generation means on the captured image.

When the image display means displays the thus obtained mixed reality image on the image display device (e.g., HMD), the observer can feel as if a virtual object (CG) appeared in the physical space.

Another system has an operation input means added to a mixed reality presentation apparatus so that, for example, the position and orientation of a virtual object (CG) can be operated. An example of the operation input means is an operation input device for games (e.g., Japanese Patent Laid-Open No. 2000-353248; corresponding to U.S. Pat. No. 6,972,734).

Some arrangements have no physical image capturing means. In this case, the image display device itself needs to be optically see-through and capable of observing the physical space before eyes. In this case, it is only necessary that the virtual image generation means displays the virtual object, and no composition means is required.

There is also a system which allows not only one person to observe and operate a mixed reality space but a plurality of persons to simultaneously experience and operate a single mixed reality space. In this case, a virtual scene management means for managing the state of the scene of the virtual space is provided. The virtual image generation means of each observer renders the virtual space image from his/her viewpoint of observation based on scene information obtained from the virtual scene management means. This allows every observer to observe the scene with the same contents from his/her viewpoint. When a plurality of operation input devices are prepared, the observers can operate the same virtual space.

According to such a system configuration, every observer can observe the mixed reality space simultaneously from the viewpoint of his/her own and operate a virtual object.

The conventional mixed reality presentation apparatus sometimes determines the operation contents by combining observer information such as the direction of line of sight of each observer with information input to the operation input device. An example will be described. FIG. 11 is a view showing a state wherein each of two observers is observing a mixed reality image.

Observers 1101 and 1102 wear HMDs 1103 and 1104 on heads and hold operation input devices 1105 and 1106 in hands, respectively. FIG. 12 is a view showing an example of the operation input device applicable to the operation input devices 1105 and 1106. Referring to FIG. 12, a cursor button 1206 inputs instructions to move a virtual object as an operation target to the far, near, right, and left sides. For example, the user can input an instruction to move a virtual object as an operation target to the far side by pressing the cursor button 1206 in the direction of X. Buttons 1202 to 1205 are used for inputting various kinds of instructions.

The operation input device connects to a computer (not shown) via a cable 1201. Operation instructions by the cursor button 1206 or buttons 1202 to 1205 are sent to the computer via the cable 1201.

Referring back to FIG. 11, a virtual object 1107 is the operation target of the operation input devices 1105 and 1106. An explanatory arrow 1199 indicates the far side for the observer 1102 along his/her line of sight. An explanatory arrow 1198 indicates the far side for the observer 1101 along his/her line of sight. In this example, the observer 1101 can input an instruction to move the virtual object 1107 in the direction of the arrow 1198 by using the operation input device 1105 (e.g., by pressing the cursor button 1206 in the direction of X). The observer 1102 can input an instruction to move the virtual object 1107 in the direction of the arrow 1199 by using the operation input device 1106 (e.g., by pressing the cursor button 1206 in the direction of X).

In this case, each observer wants to move the virtual object 1107 in the direction to increase the distance from him/her (to the far side viewed from him/her). The moving direction of the virtual object 1107 can change in accordance with the direction of line of sight of each observer even when the same key operation is executed (the cursor button 1206 is pressed in the direction of X), resulting in a convenient operation method.

As another example of the operation method of determining the operation contents by using observer information such as the direction of line of sight of an observer, one of a plurality of virtual objects may be selected by selecting a virtual object closest to the screen center in the image seen by the observer upon pressing a button.

As described above, conventionally, determination is done based on both observer information (the position and orientation of the observer's head or the information of the observed screen) and operation input information from an operation input device and reflected on the operation.

Additionally, if an observer is going to change a set value (e.g., color setting of the display) of his/her HMD by using the operation input device, it is necessary to manage the association between the observer information (which observer is wearing which HMD) and the operation input device to specify the target HMD whose set value is to be changed by the information input to the device.

According to the conventional method, operation input devices and image display devices need to be associated in advance, resulting in cumbersomeness. A problem is posed if the number of operation input devices is smaller than that of image display devices. This problem will be described below in more detail.

In the example shown in FIG. 11, a plurality of persons share a single mixed reality space and execute a cooperative operation, as described above. In FIG. 11, the operation input device 1105 is associated with the HMD 1103 in advance. When the observer 1101 who is wearing the HMD 1103 presses the cursor button 1206 of the operation input device 1105 in the direction of X, the direction of line of sight of the HMD 1103, that is, the direction of line of sight of the observer 1101 (direction of arrow 1198) is interpreted as the "far side". Hence, the virtual object 1107 moves in the direction of arrow 1198.

Similarly, when the observer 1102 presses the cursor button 1206 of the operation input device 1106 in the direction of X, the direction of line of sight of the observer 1102 (direction of arrow 1199) is interpreted as the "far side". Hence, the virtual object 1107 moves in the direction of arrow 1199.

If the observer 1101 erroneously takes the operation input device 1106 and presses the cursor button 1206 in the direction of X, the direction of line of sight of the observer 1102 is interpreted as the "far side" so that an operation result unwanted by the observer 1101 is obtained (the virtual object 1107 moves to the "near side" of the observer 1101). To prevent this, each of the observers 1101 and 1102 must take care which operation input device should be held in correspondence with his/her HMD, resulting in cumbersomeness. In addition, it is impossible to allow a plurality of observers to share one operation input device. As many operation input devices as observers must be prepared.

SUMMARY OF THE INVENTION

The present invention has been made in consideration of the above-described problems, and has as its object to provide a technique of facilitating association between an HMD and an operation input device.

According to one aspect of the present invention, an image processing method comprises:

an acquisition step of acquiring an image from an image sensing device that senses a physical space; and a management step of managing, in a memory, first information to identify the image sensing device and second information to identify an operation input device to input an operation for a virtual object, in association with each other if the image acquired in the acquisition step contains the second information.

According to another aspect of the present invention, an image processing method of execution in an image processing system, the method comprising:

a first acquisition step of acquiring a position and orientation of a head mounted display device;

a second acquisition step of acquiring a position and orientation of an operation input device to input an operation for a virtual object; and a management step of managing, in a memory, first information to identify the head mounted display device and second information to identify the operation input device in association with each other if the position and orientation acquired in the first acquisition step and the position and orientation acquired in the second acquisition step satisfy a predetermined relationship.

According to still another aspect of the present invention, an image processing apparatus comprising:

acquisition means for acquiring an image from an image sensing device that senses a physical space; and management means for managing, in a memory, first information to identify the image sensing device and second information to identify an operation input device to input an operation for a virtual object, in association with each other if the image acquired by the acquisition means contains the second information.

According to yet another aspect of the present invention, an image processing apparatus comprising:

first acquisition means for acquiring a position and orientation of a head mounted display device;

second acquisition means for acquiring a position and orientation of an operation input device to input an operation for a virtual object; and management means for managing, in a memory, first information to identify the head mounted display device and second information to identify the operation input device in association with each other if the position and orientation acquired by the first acquisition means and the position and orientation acquired by the second acquisition means satisfy a predetermined relationship.

Further features of the present invention will become apparent from the following description of exemplary embodiments (with reference to the attached drawings).

BRIEF DESCRIPTION OF THE DRAWINGS

FIG. 4 is a view showing an arrangement example of a table that manages the positions and orientations of video cameras 113 and 114, which are stored in the shared memory 107;

FIG. 6 is a view showing an arrangement example of a table that manages whether a cursor button 906 is pressed in the direction of X in operation input devices corresponding to DID=1, 2;

FIGS. 8A to 8C are views showing arrangement examples of a table that represents the association between the observers and the operation input devices in various states;

FIG. 12 is a view showing an example of an operation input device applicable to the operation input devices 1105 and 1106;

FIG. 15 is a view showing an arrangement example of a table that registers the positions and orientations of position and orientation sensors 120, 121, 122, and 123, which are managed in a shared memory 107; and FIG. 16 is a flowchart of a series of processes of causing a PC 106 to manage various kinds of information registered in the shared memory 107.

DESCRIPTION OF THE EMBODIMENTS

First Embodiment

Figure 1:
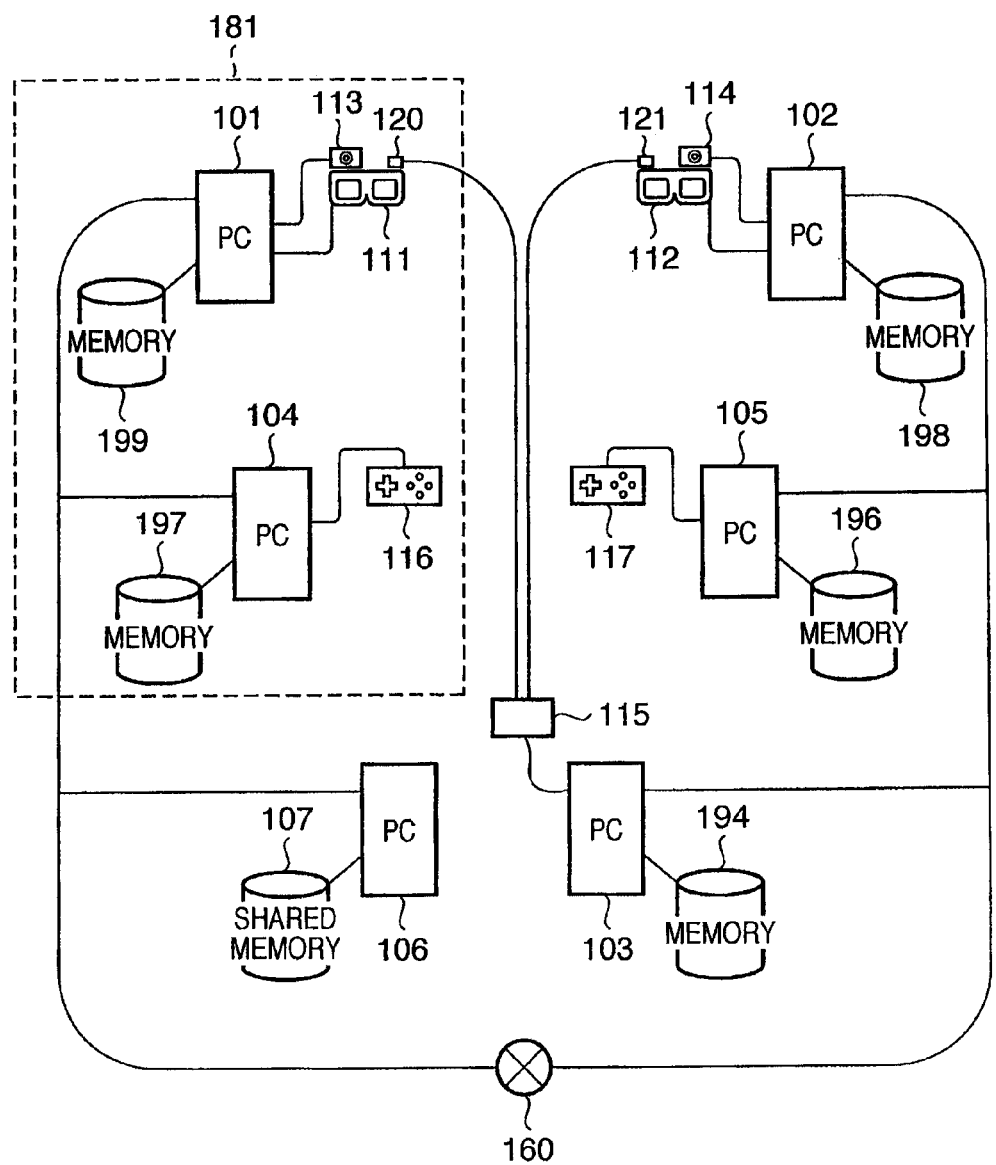
FIG. 1 is a block diagram showing a configuration example of a system according to the first embodiment of the present invention.

FIG. 1 is a block diagram showing a configuration example of a system according to this embodiment. The system shown in FIG. 1 has a configuration to make two observers sense a mixed reality space (mixed space of a physical space and a virtual space). However, those skilled in the art can easily build a system to make an arbitrary number of observers sense a mixed reality space based on the following description, as will be described later in detail.

The configuration of the system applicable to the embodiment is not limited to that shown in FIG. 1, and those skilled in the art can make various changes and modifications, as needed, as will be described later in detail.

Referring to FIG. 1, a PC (Personal Computer) 101 generates an image of a mixed reality space (mixed reality space image) to be presented to an observer (first observer) and outputs the generated mixed reality space image to an HMD 111 connected to the PC 101.

A PC 102 generates a mixed reality space image to be presented to the other observer (second observer) and outputs the generated mixed reality space image to an HMD 112 connected to the PC 102.

Memories 199 and 198 each serving as an external storage device connect to the PCs 101 and 102, respectively, and save programs and data necessary in the PCs. The memories 199 and 198 can also record new information.

A video camera 113 is attached to the HMD 111 to sense a moving image of the physical space before the eyes of the first observer when the first observer wears the HMD 111 on his/her head. Frame images (physical space images) sensed by the video camera 113 are sequentially sent to the PC 101.

This also applies to the HMD 112. A video camera 114 is attached to the HMD 112 to sense a moving image of the physical space before the eyes of the second observer when he/she wears the HMD 112 on his/her head. Frame images (physical space images) sensed by the video camera 114 are sequentially sent to the PC 102.

A PC, and an HMD and video camera connected to it are assigned the same identification information. A PID (Player ID) is used as the identification information. In this embodiment, PID=1 is assigned to the PC 101, HMD 111, and video camera 113 while PID=2 is assigned to the PC 102, HMD 112, and video camera 114.

A position and orientation sensor 120 to measure the position and orientation of the video camera 113 is attached to the HMD 111 near the video camera 113. If the position and orientation sensor 120 is, for example, a magnetic sensor, it detects a magnetic field corresponding to its position and orientation on a coordinate system (sensor coordinate system) that defines the position of the magnetic field originating source as the origin and three axes perpendicularly crossing each other at the origin as the X-, Y-, and Z-axes. A signal representing the detection result is sent to a controller 115 to be described later. A position and orientation sensor of any other type is usable if it can measure the position and orientation of the video camera 113.

This also applies to the HMD 112. A position and orientation sensor 121 to measure the position and orientation of the video camera 114 is attached to the HMD 112 near the video camera 114. If the position and orientation sensor 121 is, for example, a magnetic sensor, it detects a magnetic field corresponding to its position and orientation on a sensor coordinate system and sends a signal representing the detection result to the controller 115 to be described later. A position and orientation sensor of any other type is usable if it can measure the position and orientation of the video camera 114.

Each position and orientation sensor is assigned identification information corresponding to the video camera as the measurement target. An SID (Sensor ID) is used as the identification information. In this embodiment, SID=1 is assigned to the position and orientation sensor 120 that measures the position and orientation of the video camera 113 with PID=1 while SID=2 is assigned to the position and orientation sensor 121 that measures the position and orientation of the video camera 114 with PID=2.

Referring to FIG. 1, a PC 103 connects to the controller 115. As described above, the position and orientation sensors 120 and 121 connect to the controller 115. The controller 115 obtains a position and orientation based on a signal received from a position and orientation sensor. More specifically, upon receiving a signal from the position and orientation sensor 120, the controller 115 obtains the position and orientation of the position and orientation sensor 120 based on the signal. Upon receiving a signal from the position and orientation sensor 121, the controller 115 obtains the position and orientation of the position and orientation sensor 121 based on the signal. The obtained position and orientation are sent to the PC 103 as data. The PC 103 sends the received data to a PC 106 to be described later.

A memory 194 serving as an external storage device connects to the PC 103 and saves programs and data necessary in the PC 103. The memory 194 can also record new information.

Operation input devices 116 and 117 connect to PCs 104 and 105, respectively. The operation input devices 116 and 117 are assigned identification information. A DID (Device ID) is used as the identification information. In this embodiment, DID=1 is assigned to the operation input device 116 while DID=2 is assigned to the operation input device 117.

Figure 9:
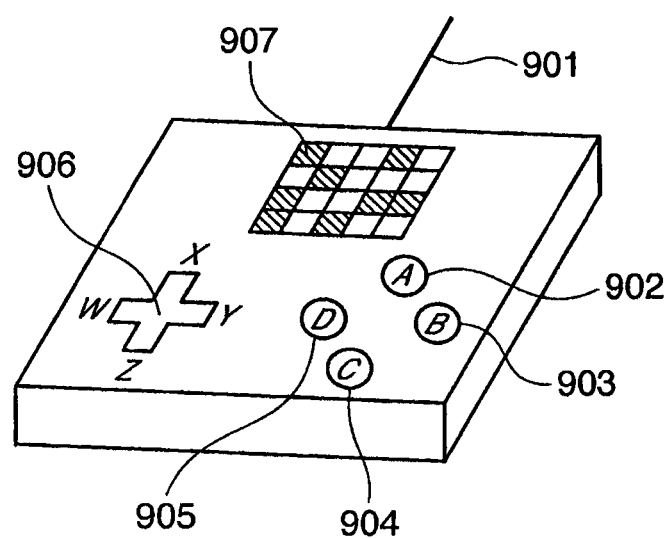
FIG. 9 is a perspective view showing the outer appearance of the operation input device 116 (117)

FIG. 9 is a perspective view showing the outer appearance of the operation input device 116 (117). Referring to FIG. 9, a cursor button 906 inputs instructions to move a virtual object as an operation target to the far, near, right, and left sides. For example, the user can input an instruction to move a virtual object as an operation target to the far side by pressing the cursor button 906 in the direction of X. Buttons 902 to 905 are used for inputting various kinds of instructions.

Operation instructions input by the cursor button 906 or buttons 902 to 905 are sent as signals to the PC 104 (105) via a cable 901.

A two-dimensional bar code 907 indicating identification information corresponding to the operation input device 116 (117) is placed at a predetermined position on the operation input device 116 (117). The identification information indicated by the two-dimensional bar code is defined as PicID (>0). In this embodiment, PicID has the same value as DID. More specifically, the two-dimensional bar code 907 indicating PicID=1 is placed on the operation input device 116 with DID=1, while the two-dimensional bar code 907 indicating PicID=2 is placed on the operation input device 117 with DID=2.

Referring back to FIG. 1, memories 197 and 196 each serving as an external storage device connect to the PCs 104 and 105, respectively, and save programs and data necessary in the PCs. The memories 197 and 196 can also record new information.

The PC 106 has an externally accessible shared memory 107. The shared memory 107 stores various kinds of information to be described later. The remaining PCs can read out or update information stored in the shared memory 107 by accessing it. The PC 106 controls access to the shared memory 107.

The above-described PCs connect to a network 160 such as a LAN. Hence, the PCs can execute data communication between them via the network 160.

The system according to this embodiment includes the above-described devices. As described above, the system provides a mixed reality to two observers. To provide a mixed reality to N (N≥1) observers, N sets of device groups (sets) 181 indicated by the dotted line are connected to the network 160, and the position and orientation sensor in each set is connected to the controller 115.

In the system shown in FIG. 1, the PCs are provided in accordance with their purposes. If more processes can be allocated to one PC, the system can be formed by a smaller number of PCs.

That is, those skilled in the art can make various changes and modifications to the system configuration, as needed, as described above.

Figure 10:
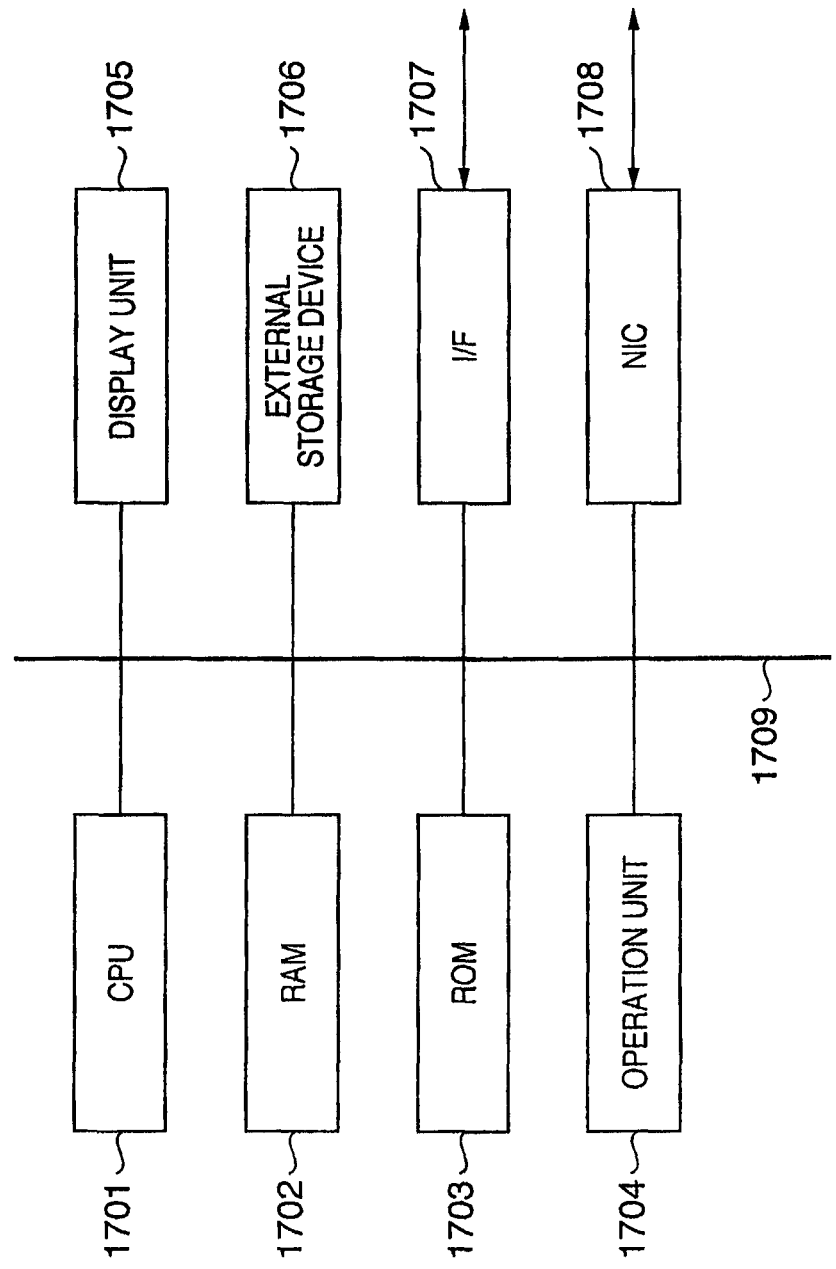
FIG. 10 is a block diagram showing a hardware configuration example of a computer applicable to each PC.
Figure 11:
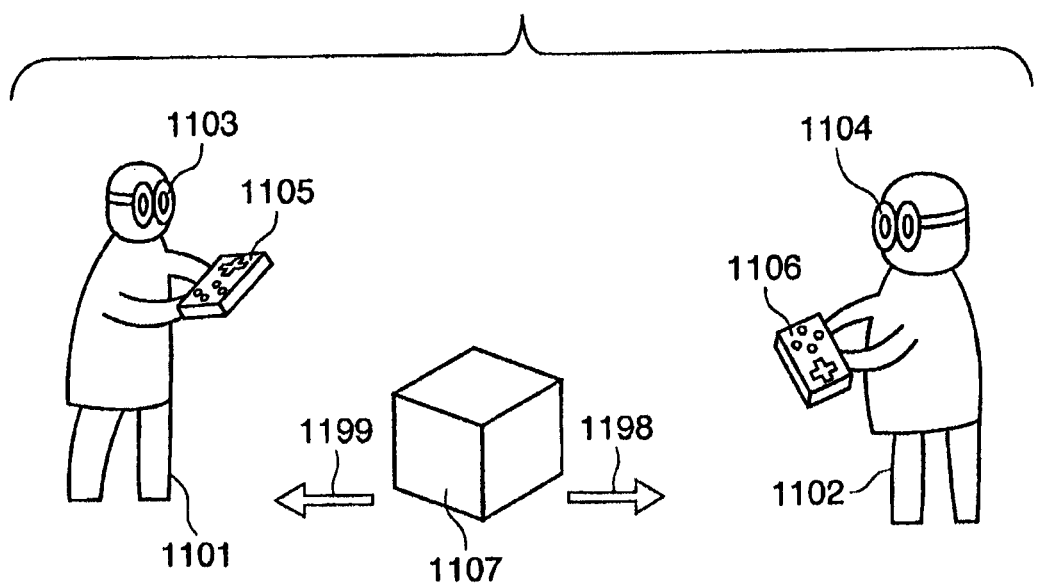
FIG. 11 is a view showing a state wherein each of two observers is observing a mixed reality image.

FIG. 10 is a block diagram showing a hardware configuration example of a computer applicable to each PC.

A CPU 1701 executes various processes of a PC to which the computer is applied by using programs and data stored in a RAM 1702 and a ROM 1703.

The RAM 1702 can provide various areas, as needed, including an area to temporarily store programs and data loaded from an external storage device 1706 (connected to the PC to which the computer is applied and corresponding to a memory shown in FIG. 1) or programs and data received from an external device via an I/F 1707 or an NIC 1708, and a work area to be used by the CPU 1701 to execute various kinds of processes.

The ROM 1703 stores the setting data and boot programs of the PC to which the computer is applied.

The operator of this computer can input various kinds of instructions to the CPU 1701 by operating an operation unit 1704 including a keyboard and a mouse.

A display unit 1705 including a CRT or a liquid crystal panel can display the process result of the CPU 1701 by an image or a text.

The external storage device 1706 is a mass storage device represented by a hard disk drive. The external storage device 1706 saves the OS (Operating System), and various programs and data that will be explained as programs and data held by the PC to which the computer is applied. The programs and data are loaded to the RAM 1702, as needed, under the control of the CPU 1701. The CPU 1701 executes processes by using the loaded programs and data.

The I/F 1707 connects to various kinds of external devices explained as devices connected to the PC to which the computer is applied. The PC, to which the computer is applied, executes data communication with various kinds of external devices via the I/F 1707.

The NIC 1708 connects the computer to the network 160. The computer executes data communication with another PC via the NIC 1708.

A bus 1709 connects the above-described units.

Various modifications can be made for the hardware configuration of the computer applicable to each PC. For example, hardware dedicated to image processes may be added to the above-described configuration so that the hardware can execute general image processes.

Figure 2:
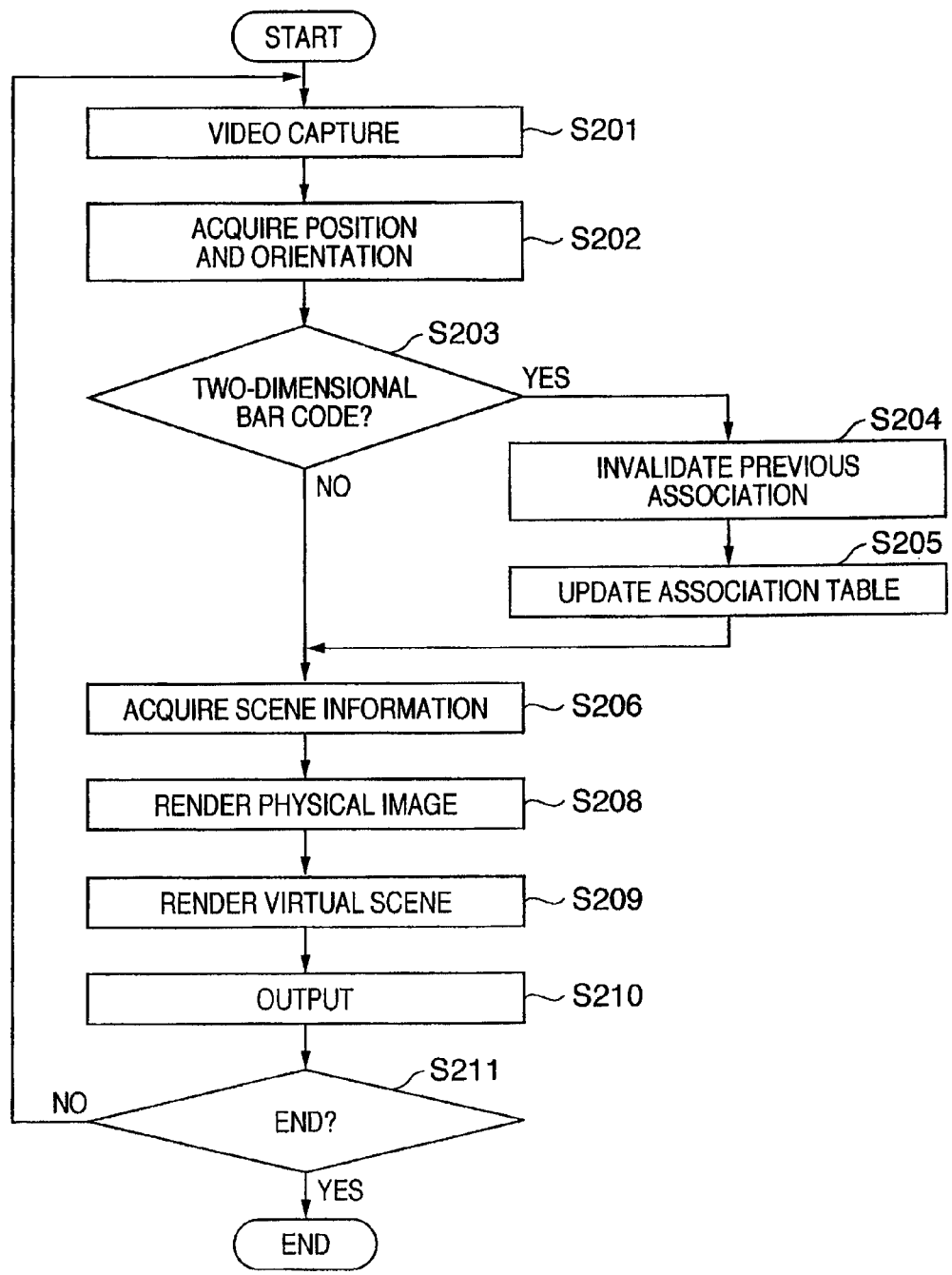
FIG. 2 is a flowchart of a process of causing PCs 101 and 102 in the system to generate and output a mixed reality space image.

FIG. 2 is a flowchart of a process of causing the PCs 101 and 102 in the system to generate and output a mixed reality space image of one frame. The external storage device 1706 of the PC 101 (102) saves the program and data which cause the CPU 1701 of the PC 101 (102) to execute the process according to the flowchart in FIG. 2. The CPU 1701 loads the program and data to the RAM 1702 and executes the process by using the loaded program and data. The PC 101 (102) thus executes the process to be described below.

A process to be executed by a PC with PID=P will be described below. That is, the process to be described below is executed by the PC 101 when P=1 or by the PC 102 when P=2.

In step S201, a physical space image sensed by a video camera with PID=P (the video camera 113 when P=1 or the video camera 114 when P=2) is acquired in the RAM 1702. In step S202, the CPU 1701 accesses the shared memory 107 and acquires, from it, the position and orientation of the video camera with PID=P (video camera position and orientation measured by a position and orientation sensor with PID=P (the position and orientation sensor 120 when P=1 or the position and orientation sensor 121 when P=2)).

FIG. 4 is a view showing an arrangement example of a table that manages the positions and orientations of the video cameras 113 and 114, which are stored in the shared memory 107. The table shown in FIG. 4 manages a position (X,Y,Z) and orientation (Roll,Pitch,Yaw) measured by the position and orientation sensor corresponding to each SID. The table shown in FIG. 4 is generated by causing the PC 103 to receive, from the controller 115, position and orientation information obtained by the controller 115 based on the measurement result obtained by the position and orientation sensor corresponding to each SID and write the position and orientation information corresponding to each SID in the shared memory 107 together with the SID.

In this embodiment, the SID of a position and orientation sensor has the same value as the PID of a video camera as the measurement target of the position and orientation sensor. Hence, in step S202, the CPU 1701 acquires the PID assigned to it from the external storage device 1706 and acquires, from the table stored in the shared memory 107, a position and orientation corresponding to an SID having the same value as the acquired PID.

In step S203, the CPU 1701 checks whether the two-dimensional bar code exists in the image acquired in step S201.

The technique of detecting a bar code in an image is a known technique and will not be explained.

If it is determined by the check that the two-dimensional bar code 907 exists in the image, PicID indicated by the two-dimensional bar code 907 is acquired by reading it and temporarily stored in the RAM 1702. The process advances to step S204.

In step S204, the CPU 1701 accesses the shared memory 107 and refers a "table representing the association between DIDs and PIDs", which is held in the shared memory 107. FIGS. 8A to 8C are views showing arrangement examples of the table in various states.

In this table, a predetermined value (e.g., "−1") is written in a DID field where the same value as the PicID acquired in step S203 is recorded. For example, if a DID corresponding to PID=N has the predetermined value, it is interpreted that "no operation input device corresponding to the device with PID=N exists".

After the process in step S204, the table is updated in step S205 by recording the PicID acquired in step S203 in the DID field corresponding to PID=P in the table referred in step S204. The process advances to step S206.

The "table representing the association between DIDs and PIDs" will be described with reference to FIGS. 8A to 8C. FIG. 8A shows an arrangement example of the table in the initial state. As shown in FIG. 8A, "−1" is stored as a DID value corresponding to PID=1, and "−1" is stored as a DID value corresponding to PID=2. That is, the table shown in FIG. 8A indicates that an operation input device corresponding to the device with PID=1 and an operation input device corresponding to the device with PID=2 do not exist.

FIG. 8B shows an arrangement example of the table in which DID=1 is associated with PID=1, and DID=2 is associated with PID=2. As shown in FIG. 8B, DID=1 is associated with PID=1, and DID=2 is associated with PID=2. This table indicates that the operation input device 116 with DID=1 is associated with the device with PID=1, and the operation input device 117 with DID=2 is associated with the device with PID=2. That is, the table is generated by causing the video camera 113 with PID=1 to sense the two-dimensional bar code 907 on the operation input device 116 with DID=1 and causing the video camera 114 with PID=2 to sense the two-dimensional bar code 907 on the operation input device 117 with DID=2.

FIG. 8C shows an arrangement example of the table generated by causing the video camera 113 with PID=1 to sense the two-dimensional bar code 907 on the operation input device 117 with DID=2 after the table state shown in FIG. 8B. The video camera 113 with PID=1 senses the two-dimensional bar code 907 on the operation input device 117 with DID=2 after the table state shown in FIG. 8B. Since the PicID of the two-dimensional bar code 907 is "2", "−1" is recorded in the field with DID=2 in step S204. In step S205, "2" as the PicID of the two-dimensional bar code 907 is recorded in the DID field corresponding to PID=1 of the video camera 113.

Referring back to FIG. 2, if it is determined by the check in step S203 that no two-dimensional bar code 907 exists, the process advances to step S206.

In step S206, the CPU 1701 accesses the shared memory 107 and reads out scene information stored in it. Scene information is a data group that defines a virtual space, such as the rendering data of each virtual object included in the virtual space (if a virtual object is formed from polygons, the rendering data contains the color data and normal data of each polygon, the position data of each vertex of the polygons, and texture data), the layout position and orientation data of each virtual object, and data about a light source arranged in the virtual space. The scene information is updated as needed by the processes to be described later.

In step S208, the physical space image acquired in step S201 is rendered on a predetermined area of the RAM 1702. In step S209, an image (virtual space image) of a virtual space which is based on the scene information acquired in step S206 and seen from the viewpoint with the position and orientation acquired in step S202 is generated and rendered on the predetermined area where the physical space image is rendered in step S208.

With this process, a mixed reality space image with the virtual space image superimposed on the physical space image is generated on the predetermined area. In step S210, the CPU 1701 outputs the mixed reality space image to the HMD with PID=P (the HMD 111 when P=1 or the HMD 112 when P=2) via the I/F 1707.

In step S211, it is checked whether a condition to complete the process is satisfied, or a completion instruction is input via the operation unit 1704. If it is determined by the check that the condition to complete the process is satisfied, or a completion instruction is input via the operation unit 1704, the process is ended. If the condition to complete the process is not satisfied, and no completion instruction is input via the operation unit 1704, the process returns to step S201 to execute the process to generate the mixed reality space image of the next frame. If the HMD has independent systems for left and right eyes (the HMD can present a stereoscopic vision), the above-described process is repeated for the left and right eyes (screens).

Figure 3:
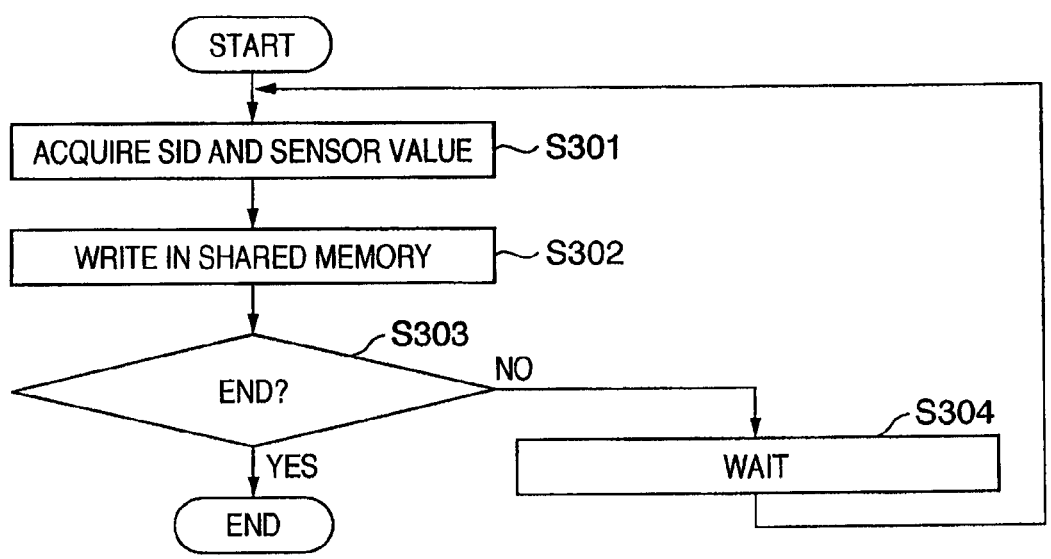
FIG. 3 is a flowchart of a process of causing a PC 103 to register, in a shared memory 107, position and orientation data received from a controller 115.

A process of causing the PC 103 to register, in the shared memory 107, position and orientation data received from the controller 115 will be described below with reference to FIG. 3 that shows a flowchart illustrating the process. The external storage device 1706 of the PC 103 saves the program and data which cause the CPU 1701 of the PC 103 to execute the process according to the flowchart in FIG. 3. The CPU 1701 loads the program and data to the RAM 1702 and executes the process by using the loaded program and data. The PC 103 thus executes the process to be described below.

Each of the position and orientation sensors 120 and 121 connects to one of a plurality of connectors of the controller 115. When the association between a position and orientation sensor and a connector is determined in advance, the controller 115 can specify the position and orientation sensor from which position and orientation data is obtained. In other words, the controller 115 can acquire the position and orientation data of a sensor corresponding to a desired SID.

Hence, in step S301, the CPU 1701 acquires position and orientation data corresponding to all SIDs from the controller 115 and temporarily stores the SIDs and acquired position and orientation data in the RAM 1702.

In step S302, the SIDs and position and orientation data acquired in step S301 are registered in the table shown in FIG. 4 which is registered in the shared memory 107. Referring to FIG. 4, for example, (x1,y1,z1) is registered as position data corresponding to SID=1, and (Roll1,Pitch1,Yaw1) is registered as orientation data. Similarly, (x2,y2,z2) is registered as position data corresponding to SID=2, and (Roll2,Pitch2, Yaw2) is registered as orientation data.

FIG. 4 shows a state wherein the position and orientation data of two sensors are registered. When N sensors send position and orientation data to the shared memory 107 via the controller 115 and PC 103, a table with N rows is generated. Position and orientation data corresponding to an SID is registered in each row.

Referring back to FIG. 3, in step S303, it is checked whether a condition to complete the process is satisfied, or a completion instruction is input via the operation unit 1704. If it is determined by the check that the condition to complete the process is satisfied, or a completion instruction is input via the operation unit 1704, the process is ended. If the condition to complete the process is not satisfied, and no completion instruction is input via the operation unit 1704, the process advances to step S304.

In step S304, the process waits for an appropriate time (e.g., 1/30 sec corresponding to one frame of a video image). Then, the process returns to step S301.

Figure 5:
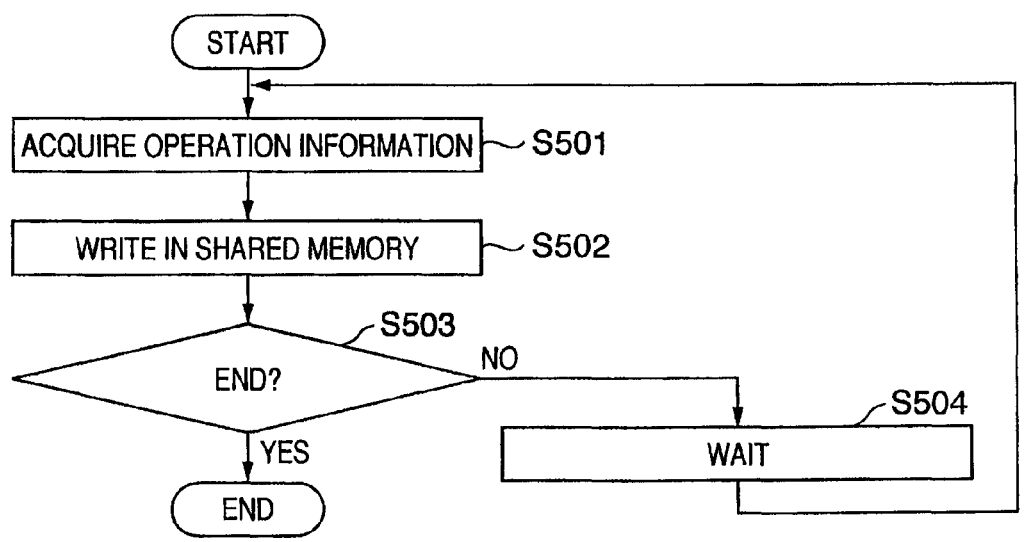
FIG. 5 is a flowchart of a series of processes of causing PCs 104 and 105 to receive operation inputs from operation input devices 116 and 117 and register the results in the shared memory 107.

A series of processes of causing the PCs 104 and 105 to receive operation inputs from the operation input devices 116 and 117 and register the results in the shared memory 107 will be described below with reference to FIG. 5 that shows a flowchart illustrating the process. The external storage device 1706 of the PC 104 (105) saves the program and data which cause the CPU 1701 of the PC 104 (105) to execute the process according to the flowchart in FIG. 5. The CPU 1701 loads the program and data to the RAM 1702 and executes the process by using the loaded program and data. The PC 104 (105) thus executes the process to be described below.

A process to be executed by a PC connected to an operation input device with DID=D will be described below. That is, the process to be described below is executed by the PC 104 connected to the operation input device 116 when D=1 or by the PC 105 connected to the operation input device 117 when D=2.

In step S501, the CPU 1701 receives operation information sent from the operation input device with DID=D. Assume that the operation input device sends operation information indicating whether the cursor button 906 is pressed in the direction of X, for descriptive convenience. Upon receiving the operation information, the CPU 1701 temporarily stores it in the RAM 1702.

Figure 6:
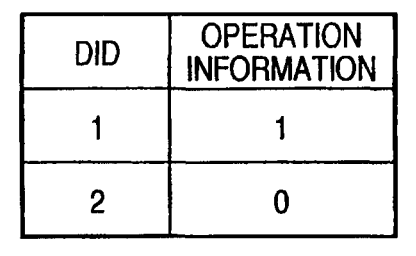

In step S502, if the cursor button 906 is pressed in the direction of X, "1" is recorded in an operation information field corresponding DID=D in a table shown in FIG. 6 which is held in the shared memory 107. In step S502, if the cursor button 906 is not pressed in the direction of X, "0" is recorded in the operation information field. FIG. 6 is a view showing an arrangement example of a table that manages whether the cursor button 906 is pressed in the direction of X in the operation input devices corresponding to DID=1, 2.

FIG. 6 shows a state wherein the pieces of operation information of two operation input devices are registered. To register pieces of operation information of N operation input devices, a table with N rows is generated. Operation information corresponding to a DID is registered in each row.

To manage operation information of a plurality of kinds of operations, an area to hold an operation state of all operations is provided in the table.

When a plurality of operation input devices connect to one PC, the process in steps S501 and S502 is executed for each operation input device.

Referring back to FIG. 5, in step S503, it is checked whether a condition to complete the process is satisfied, or a completion instruction is input via the operation unit 1704. If it is determined by the check that the condition to complete the process is satisfied, or a completion instruction is input via the operation unit 1704, the process is ended. If the condition to complete the process is not satisfied, and no completion instruction is input via the operation unit 1704, the process advances to step S504.

In step S504, the process waits for an appropriate time (e.g., 1/30 sec corresponding to one frame of a video image). Then, the process returns to step S501.

Figure 7:
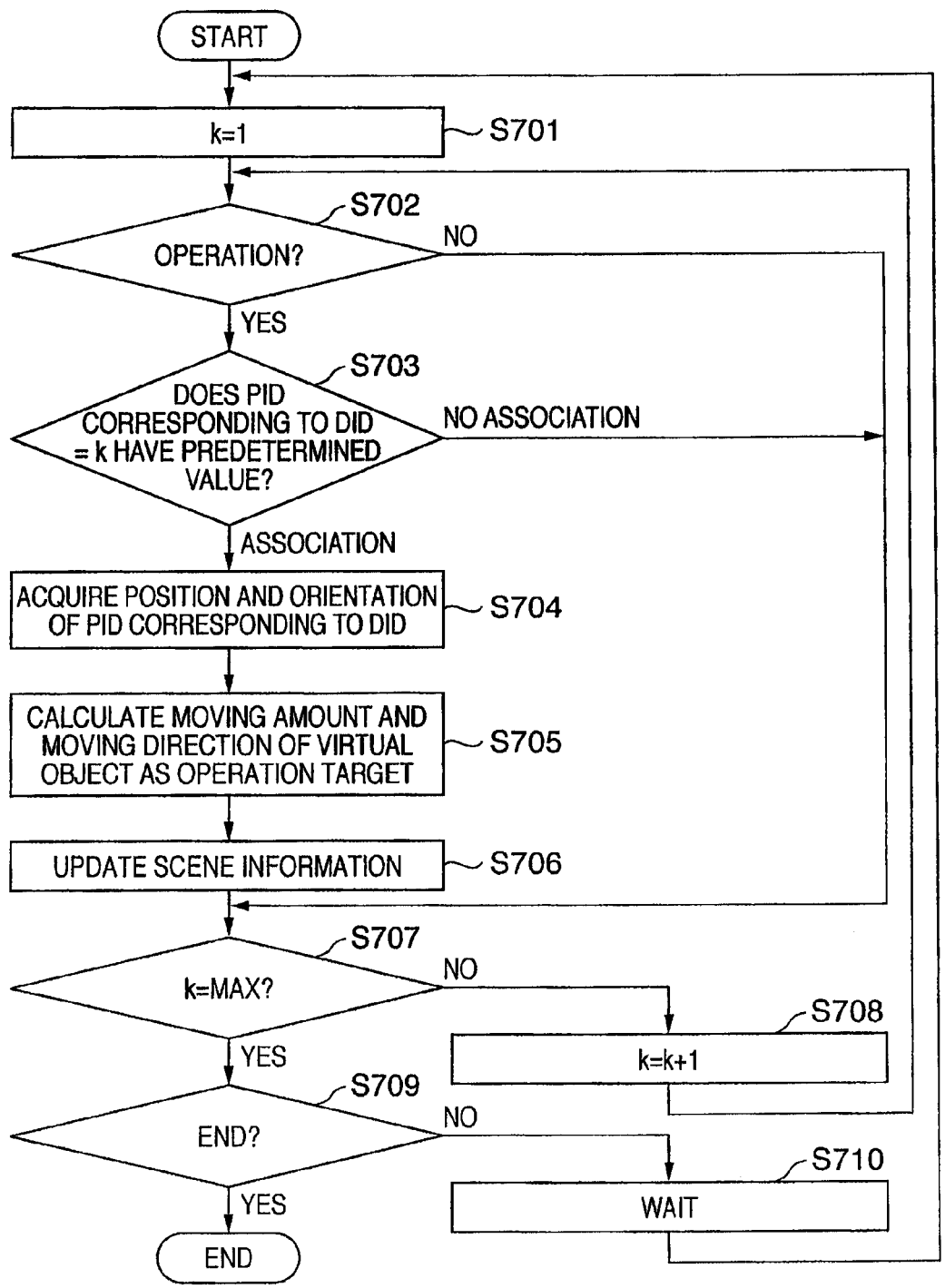
FIG. 7 is a flowchart of a series of processes of causing a PC 106 to manage various kinds of information registered in the shared memory 107.

A series of processes of causing the PC 106 to manage various kinds of information registered in the shared memory 107 will be described below with reference to FIG. 7 that shows a flowchart illustrating the process. The external storage device 1706 of the PC 106 saves the program and data which cause the CPU 1701 of the PC 106 to execute the process according to the flowchart in FIG. 7. The CPU 1701 loads the program and data to the RAM 1702 and executes the process by using the loaded program and data. The PC 106 thus executes the process to be described below.

In step S701, a variable k is initialized to 1. In step S702, whether an operation is done is checked by referring to operation information corresponding to DID=k in the table shown in FIG. 6 which is managed in the shared memory 107. That is, in this embodiment, it is checked whether operation information=1. If it is determined by the check that operation information=1, that is, the cursor button 906 of the operation input device with DID=k is pressed in the direction of X, the process advances to step S703. If operation information=0, the process advances to step S707.

In step S703, it is checked, by referring the table shown in FIGS. 8A to 8C, whether PID corresponding to DID=k has a predetermined value ("−1" in this embodiment). If PID has the predetermined value, that is, no device corresponding to the operation input device with DID=k exists, the process advances to step S707. If PID corresponding to DID=k does not have the predetermined value, that is, a device corresponding to the operation input device with DID=k exists, the process advances to step S704.

In step S704, letting m be the value of PID corresponding to DID=k in the table shown in FIGS. 8A to 8C, a position and orientation corresponding to PID=m are acquired from the table shown in FIG. 4. In step S705, the moving amount and moving direction of the virtual object as the operation target are calculated. In this embodiment, the virtual object as the operation target is moved by a predetermined amount in a direction having the orientation acquired in step S704 as a direction vector. As for movement, the present invention is not limited to this.

In step S706, scene information stored in the shared memory 107 is updated by changing the position and orientation of the virtual object as the operation target in accordance with the moving direction and moving amount calculated in step S705.

In step S707, it is checked whether the variable k equals the total number MAX (MAX=2 in this embodiment) of operation input devices, that is, whether the process in steps S702 to S706 is executed for all operation input devices. If k=MAX, the process advances to step S709. If k≠MAX, the process advances to step S708.

In step S708, the variable k is incremented by one by calculating k=k+1. The process returns to step S702 to execute the subsequent process.

In step S709, it is checked whether a condition to complete the process is satisfied, or a completion instruction is input via the operation unit 1704. If it is determined by the check that the condition to complete the process is satisfied, or a completion instruction is input via the operation unit 1704, the process is ended. If the condition to complete the process is not satisfied, and no completion instruction is input via the operation unit 1704, the process advances to step S710.

In step S710, the process waits for an appropriate time (e.g., 1/30 sec corresponding to one frame of a video image). Then, the process returns to step S701.

As described above, according to this embodiment, to set the association between an operation input device and an HMD, the user who wears the HMD on the head only needs to observe the two-dimensional bar code on the operation input device to be associated with the HMD. Hence, the association can more easily be set than before.

The user can perform any intended operation because he/she can operate a virtual object by using the operation input device associated with himself/herself. Even when a plurality of users use one operation input device in turn, a user who is holding the operation input device in hands can input his/her intended operation by using the operation input device only by observing the two-dimensional bar code on it once. For this reason, it is unnecessary to prepare an operation input device for each of the plurality of users.

The user may perform an operation of setting the parameters of the display device attached to the HMD by using the operation input device, instead of the above-described virtual object moving operation. The parameters include the display brightness and tint on the display device.

Second Embodiment

Figure 13:
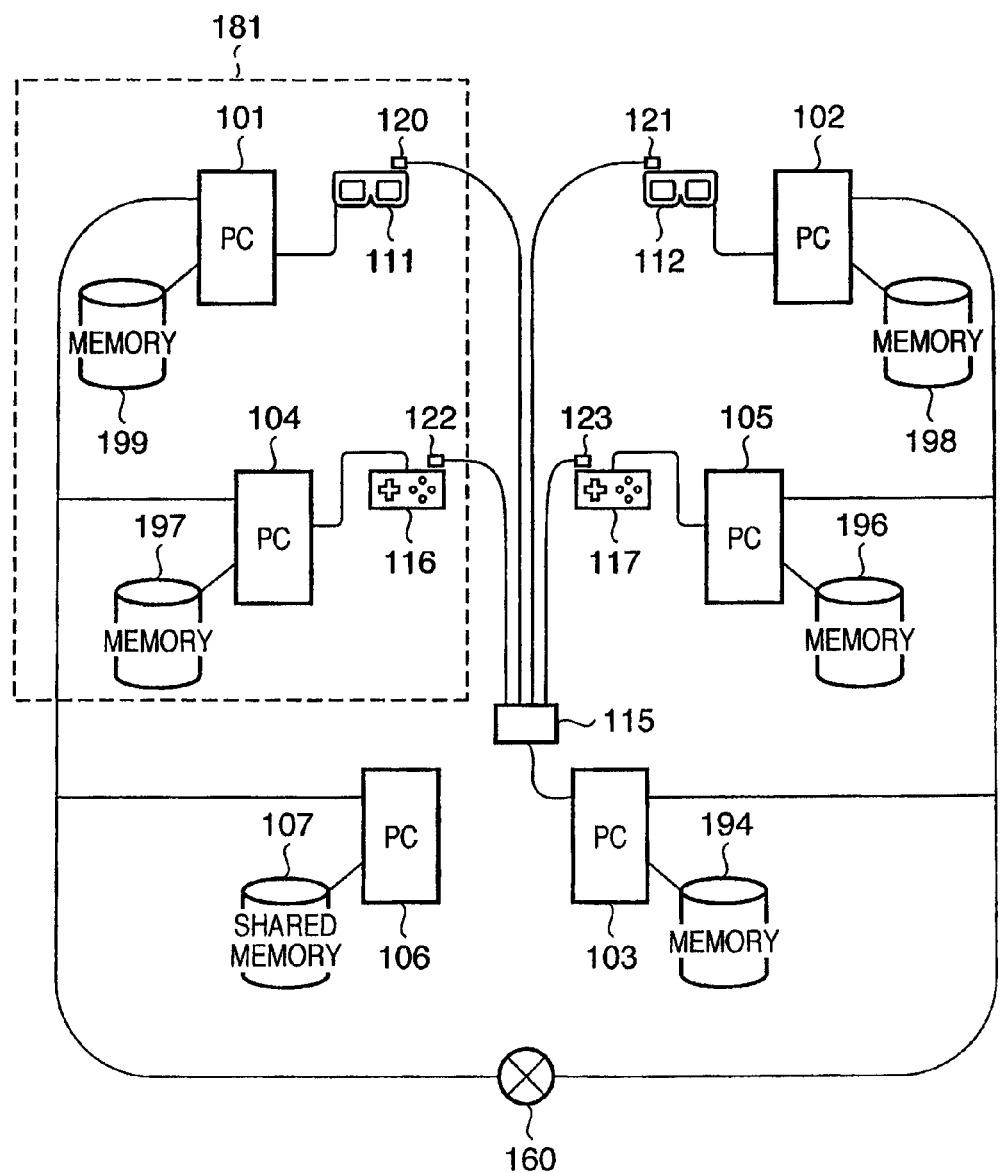
FIG. 13 is a block diagram showing a configuration example of a system according to the second embodiment of the present invention.

FIG. 13 is a block diagram showing a configuration example of a system according to this embodiment. The configuration shown in FIG. 13 includes optical see-through type HMDs 111 and 112, and the video cameras 113 and 114 are omitted, unlike the configuration shown in FIG. 1. Hence, position and orientation sensors 120 and 121 measure the positions and orientations of the HMDs 111 and 112, respectively. Position and orientation sensors 122 and 123 are attached to operation input devices 116 and 117, respectively.

Points different from the first embodiment will be described below.

The position and orientation sensor 122 measures the position and orientation of the operation input device 116 and sends the measurement result to a controller 115 as a signal. The controller 115 obtains the position and orientation of the position and orientation sensor 122 based on the received signal and sends the obtained data to a PC 103. The PC 103 sends the received data to a PC 106.

The position and orientation sensor 123 measures the position and orientation of the operation input device 117 and sends the measurement result to the controller 115 as a signal. The controller 115 obtains the position and orientation of the position and orientation sensor 123 based on the received signal and sends the obtained data to the PC 103. The PC 103 sends the received data to the PC 106.

The results measured by the position and orientation sensors 122 and 123 are processed like the results measured by the position and orientation sensors 120 and 121 and sent to the PC 106 via the controller 115 and PC 103. The PC 106 stores the received position and orientation data in a shared memory 107, as in the first embodiment. FIG. 15 is a view showing an arrangement example of a table that registers the positions and orientations of the position and orientation sensors 120, 121, 122, and 123 (the positions and orientations of the HMDs 111 and 112 and the positions and orientations of the operation input devices 116 and 117), which are managed in the shared memory 107.

Figure 14:
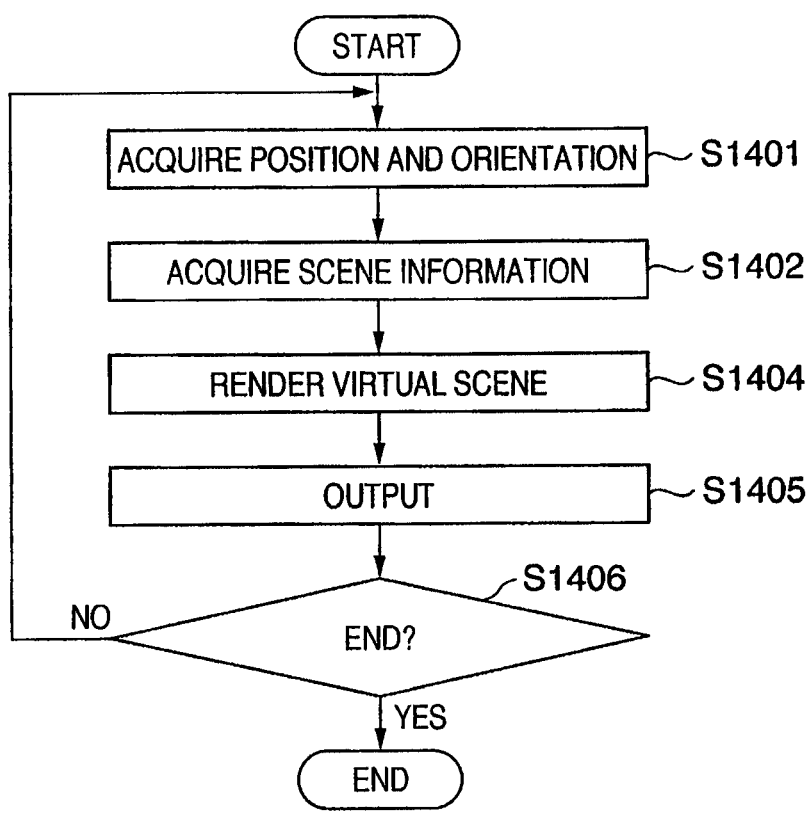
FIG. 14 is a flowchart of a process of causing PCs 101 and 102 in the system to generate and output a mixed reality space image.

FIG. 14 is a flowchart of a process of causing PCs 101 and 102 in the system to generate and output a mixed reality space image of one frame. An external storage device 1706 of the PC 101 (102) saves the program and data which cause a CPU 1701 of the PC 101 (102) to execute the process according to the flowchart in FIG. 14. The CPU 1701 loads the program and data to a RAM 1702 and executes the process by using the loaded program and data. The PC 101 (102) thus executes the process to be described below.

A process to be executed by a PC with PID=P will be described below. That is, the process to be described below is executed by the PC 101 when P=1 or by the PC 102 when P=2.

In step S1401, the CPU 1701 refers up the table shown in FIG. 15, which is managed in the shared memory 107.

In FIG. 15, the position of the HMD 111 measured by the position and orientation sensor 120 with SID=1 is registered in the (x,y,z) field corresponding to SID=1. The orientation of the HMD 111 measured by the position and orientation sensor 120 with SID=1 is registered in the (Roll,Pitch,Yaw) field.

In addition, the position of the HMD 112 measured by the position and orientation sensor 121 with SID=2 is registered in the (x,y,z) field corresponding to SID=2. The orientation of the HMD 112 measured by the position and orientation sensor 121 with SID=2 is registered in the (Roll,Pitch,Yaw) field.

The position of the operation input device 116 measured by the position and orientation sensor 122 with SID=3 is registered in the (x,y,z) field corresponding to SID=3. The orientation of the operation input device 116 measured by the position and orientation sensor 122 with SID=3 is registered in the (Roll,Pitch,Yaw) field.

The position of the operation input device 117 measured by the position and orientation sensor 123 with SID=4 is registered in the (x,y,z) field corresponding to SID=4. The orientation of the operation input device 117 measured by the position and orientation sensor 123 with SID=4 is registered in the (Roll,Pitch,Yaw) field.

This table is generated by causing the PC 103 to receive, from the controller 115, position and orientation information obtained by the controller 115 based on the measurement result obtained by the position and orientation sensor corresponding to each SID and write the position and orientation information corresponding to each SID in the shared memory 107 together with the SID.

In step S1401, the CPU 1701 acquires the PID assigned to it from the external storage device 1706 and acquires, from the table stored in the shared memory 107, a position and orientation corresponding to an SID having the same value as the acquired PID.

In step S1402, the same process as in step S206 is executed. That is, the CPU 1701 accesses the shared memory 107 and reads out scene information stored in it.

In step S1404, an image (virtual space image) of a virtual space which is based on the scene information acquired in step S1402 and seen from the viewpoint with the position and orientation acquired in step S1401 is generated and rendered on a predetermined area of the RAM 1702.

In step S1405, the CPU 1701 outputs the virtual space image to the HMD with PID=P (the HMD 111 when P=1 or the HMD 112 when P=2) via an I/F 1707.

In step S1406, it is checked whether a condition to complete the process is satisfied, or a completion instruction is input via an operation unit 1704. If it is determined by the check that the condition to complete the process is satisfied, or a completion instruction is input via the operation unit 1704, the process is ended. If the condition to complete the process is not satisfied, and no completion instruction is input via the operation unit 1704, the process returns to step S1401 to execute the process to generate the virtual space image of the next frame. If the HMD has independent systems for left and right eyes (the HMD can present a stereoscopic vision), the above-described process is repeated for the left and right eyes (screens).

A series of processes of causing the PC 106 to manage various kinds of information registered in the shared memory 107 will be described below with reference to FIG. 16 that shows a flowchart illustrating the process. The external storage device 1706 of the PC 106 saves the program and data which cause the CPU 1701 of the PC 106 to execute the process according to the flowchart in FIG. 16. The CPU 1701 loads the program and data to the RAM 1702 and executes the process by using the loaded program and data. The PC 106 thus executes the process to be described below.

In step S1601, a variable k is initialized to 1. In step S1602, whether an operation is done is checked by referring to operation information corresponding to DID=k in the table shown in FIG. 6 which is managed in the shared memory 107. This process is done as in step S702.

If a cursor button 906 of the operation input device with DID=k is pressed in the direction of X, the process advances to step S1603. If operation information=0, the process advances to step S1606.

In step S1603, the CPU 1701 refers the table shown in FIG. 15 and acquires, from it, the position and orientation of the position and orientation sensor attached to the operation input device with DID=k (in this embodiment, the position and orientation sensor 122 with SID=3 attached to the operation input device 116 with DID=1 when k=1, or the position and orientation sensor 123 with SID=4 attached to the operation input device 117 with DID=2 when k=2). An HMD closest to the position and orientation sensor attached to the operation input device with DID=k is specified from all HMDs registered in the table based on their positions and orientations (the position and orientation corresponding to SID=1 and the position and orientation corresponding to SID=2 in FIG. 15).

The process in step S1603 can be modified as needed in the following way. For example, an HMD having an orientation closest to the orientation of the position and orientation sensor attached to the operation input device with DID=k may be specified from all HMDs registered in the table based on their orientations. If there is no HMD located within a predetermined distance from the position and orientation sensor attached to the operation input device with DID=k, it may be determined that no HMD to be specified exists. Alternatively, a predetermined HMD may be specified as a specific value.

When an HMD is specified based on the position and orientation of the position and orientation sensor attached to the operation input device with DID=k, the process advances to step S1604. If no HMD is specified, the process advances to step S1606.

In step S1604, a position and orientation corresponding to the SID of the position and orientation sensor attached to the HMD specified in step S1603 are acquired from the table shown in FIG. 15, and the moving amount and moving direction of the virtual object as the operation target are calculated. In this embodiment, the virtual object as the operation target is moved by a predetermined amount in a direction having, as a direction vector, the orientation corresponding to the SID of the position and orientation sensor attached to the HMD specified in step S1603. As for movement, the present invention is not limited to this.

In step S1605, scene information stored in the shared memory 107 is updated by changing the position and orientation of the virtual object as the operation target in accordance with the moving direction and moving amount calculated in step S1604.

In step S1606, it is checked whether the variable k equals the total number MAX (MAX=2 in this embodiment) of operation input devices, that is, whether the process in steps S1602 to S1605 is executed for all operation input devices. If k=MAX, the process advances to step S1608. If k≠MAX, the process advances to step S1607.

In step S1607, the variable k is incremented by one by calculating k=k+1. The process returns to step S1602 to execute the subsequent process.

In step S1608, it is checked whether a condition to complete the process is satisfied, or a completion instruction is input via the operation unit 1704. If it is determined by the check that the condition to complete the process is satisfied, or a completion instruction is input via the operation unit 1704, the process is ended. If the condition to complete the process is not satisfied, and no completion instruction is input via the operation unit 1704, the process advances to step S1609.

In step S1609, the process waits for an appropriate time (e.g., 1/30 sec corresponding to one frame of a video image). Then, the process returns to step S1601.

When the HMD corresponding to the operation input device is specified, the identification information of the HMD is registered in the memory, although not described above. This registration process may be done as in the first embodiment.

If no HMD corresponding to the operation input device is specified, the identification information of the operation input device and a predetermined value may be registered in the memory in association with each other, as in the first embodiment.

Modifications

To manage the association between the operation input devices and the HMDs by using their positions, the position and orientation of an operation input device may be fixed, and their values may be registered in advance. An HMD having a position and orientation closest to them may be associated with the operation input device. In this case, no position and orientation sensor has to be attached to the operation input device. In this case, the position and orientation of the operation input device have predetermined values in the position and orientation table, which are not updated.

In the first and second embodiments, the association is dynamically changed when the user has observed the two-dimensional bar code on the operation input device or has come near the operation input device. If there is a requirement not to change the association, a process of temporarily inhibiting association change and fixing the association may be added.

For example, an association change inhibition flag is prepared in the shared memory 107. Before changing the association table, the flag is checked to determine whether changing the association table.

Other Embodiments

The object of the present invention is also achieved by the following method. A recording medium (or storage medium) which records software program codes to implement the functions of the above-described embodiments is supplied to a system or apparatus. The computer (or CPU or MPU) of the system or apparatus reads out and executes the program codes stored in the recording medium. In this case, the program codes read out from the recording medium themselves implement the functions of the above-described embodiments. The recording medium that records the program codes constitutes the present invention.

When the computer executes the readout program codes, the operating system (OS) running on the computer partially or wholly executes actual processing based on the instructions of the program codes, thereby implementing the functions of the above-described embodiments.

The program codes read out from the recording medium are written in the memory of a function expansion card inserted into the computer or a function expansion unit connected to the computer. The CPU of the function expansion card or function expansion unit partially or wholly executes actual processing based on the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-178582, filed Jun. 28, 2006, which is hereby incorporated by reference herein in its entirety.

What is claimed is:

1. An image processing method comprising:
   an acquisition step of acquiring an image from an image sensing device that senses a physical space;
   a detection step of detecting an identification marker which represents first identification information to identify one of a plurality of operation input devices used to input an operation for a virtual object, from the acquired image;
   a registering step of registering, in a memory, second identification information to identify the image sensing device and the first identification information represented by the detected identification marker, paired with each other;
   a generation step of, upon detecting the operation input by the one operation input device, generating an image of the virtual object on which the operation has been performed;
   an identification step of referring to the first and second identification information registered in the memory to identify the image sensing device whose the second identification information is paired with the first identification information of the one operation input device which input the operation; and
   a display step of displaying the image generated in the generating step on a display corresponding to the image sensing device identified in the identification step.

2. The method according to claim 1, wherein in the generation step, the image of the virtual object on which the operation input by the one operation input device has been performed is generated in accordance with a position and orientation of the identified image sensing device.

3. The method according to claim 1 wherein, in the registering step, if the image acquired in the acquisition step does not contain the identification marker, the second identification information and information indicating a predetermined operation input device are registered in the memory paired with each other.

4. An image processing device, comprising:
   an acquisition unit acquiring an image from an image sensing device that senses a physical space;
   a detection unit detecting an identification marker which represents first identification information to identify one of a plurality of operation input devices used to input an operation for a virtual object, from the acquired image;
   a registering unit registering, in a memory, second identification information to identify the image sensing device and the first identification information represented by the detected identification marker, paired with each other;
   a generation unit, upon detecting the operation input by the one operation input device, generating an image of the virtual object on which the operation has been performed;
   an identification unit referring to the first and second identification information registered in the memory to identify the image sensing device whose the second identification information is paired with the first identification information of the one operation input device which input the operation; and
   a display unit displaying the image generated by the generation unit on a display corresponding to the image sensing device identified by the identification unit.

5. A non-transitory computer-readable storage medium storing a computer program to cause a computer to execute an image processing method of claim 1.

* * * * *